United States Patent [19]

Lam et al.

[11] Patent Number: 4,612,227

[45] Date of Patent: Sep. 16, 1986

[54] PRESSURE SENSOR HEADER

[75] Inventors: Ken Lam; John H. Pond, both of Colorado Springs, Colo.; Douglas W. Wilda, Ambler, Pa.

[73] Assignee: Honeywell Inc., Minneapolis, Minn.

[21] Appl. No.: 809,662

[22] Filed: Dec. 16, 1985

[51] Int. Cl.⁴ .................. B32B 3/10; B32B 3/30; G01L 9/08
[52] U.S. Cl. .................... 428/137; 428/138; 428/166; 428/223; 428/64; 73/756; 137/557
[58] Field of Search ............ 428/137, 138, 166, 223, 428/64; 73/756; 137/557

[56] References Cited

U.S. PATENT DOCUMENTS

| | | | |
|---|---|---|---|
| 4,454,765 | 6/1984 | Lodge | 73/756 X |
| 4,494,411 | 1/1985 | Koschke et al. | 73/756 X |
| 4,513,623 | 4/1985 | Kurtz et al. | 73/756 X |

*Primary Examiner*—Alexander S. Thomas
*Attorney, Agent, or Firm*—Mitchell J. Halista; Trevor B. Joike

[57] ABSTRACT

A pressure sensor header uses a layered assembly of a first and a second metal layer with an intermediate ceramic layer having a radial surface groove providing a fluid passage between a peripheral fluid port and a hole extending through the first layer between the groove and an outer surface of the first layer. A plurality of electrically conductive pins are arranged to extend through the layered assembly and are sealed to the upper and lower metal headers with glass seals to provide a fluid-tight seal. The seals on the metal pins provide a means for retaining the layered assembly in a predetermined configuration while the radial groove and the hole through the first layer provide a fluid path to a pressure transducer element supported on the first layer of the header and having an internal fluid path aligned with the hole through the first layer. Electrical connections to the metal pins provide electrical signal paths between the transducer element and associated electrical circuits.

7 Claims, 2 Drawing Figures

PRESSURE SENSOR HEADER

DESCRIPTION OF THE PRIOR ART

1. Field of the Invention

The present invention relates to pressure sensors. More specifically, the present invention is directed to a header structure for a pressure sensor to provide a fluid path to one side of a pressure sensing transducer.

2. Description of the Prior Art

Headers for pressure sensors have been provided in a transducer support assembly to isolate and to support a pressure sensing transducer, e.g., a semiconductor chip, while providing a fluid path to one side of the pressure sensing transducer. Such headers conventionally involved the provision for a fluid path through the header which was usually achieved by drilling a hole through the entire header aligned with the ultimate location of the transducer. Such a drilling operation significantly increased the cost of the header and the overall final cost of the pressure sensor. In order to achieve a lower cost for the header, it is desirable to eliminate such a drilling operation while still providing a fluid path through the header to the transducer.

SUMMARY OF THE INVENTION

An object of the present invention is to provide an improved header for a pressure sensor.

In accomplishing this and other objects, there has been provided, in accordance with the present invention, a pressure sensor header having a layered arrangement of a first and a second metal layer and an intermediate electrically non-conductive layer located therebetween with a radial groove in an outer surface of the ceramic layer connecting the peripheral edge of the ceramic layer with a fluid path through the adjacent first metallic layer and means for retaining the metal layers and the ceramic layers in a fixed spatial orientation.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

Figure 1:
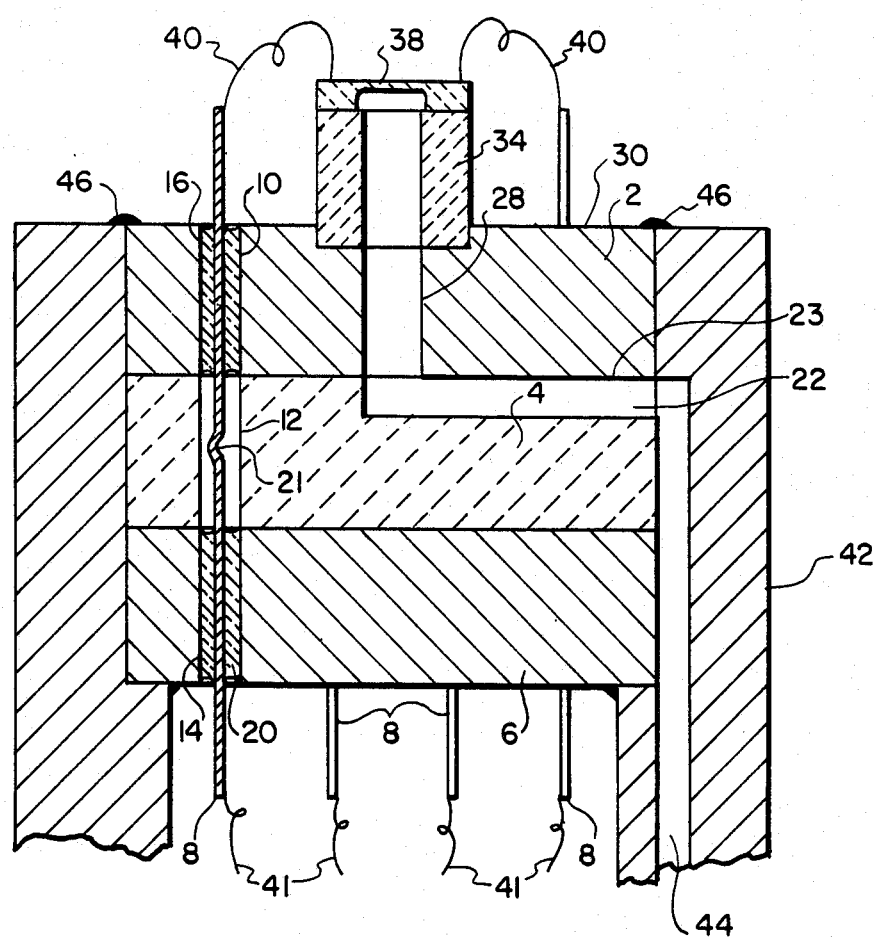
FIG. 1 is a cross-sectional illustration of a sensor header incorporating an example of an embodiment of the present invention and FIG. 2 is a top view of the intermediate layer shown in FIG. 1.
Figure 2:
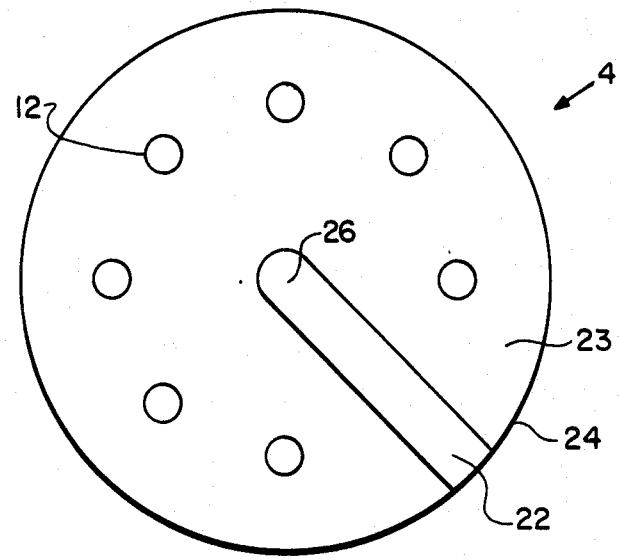

Referring to FIGS. 1 and 2 in more detail, there is shown a pressure sensor header having a first metal layer 2 on one side of intermediate electrically non-conductive layer 4, e.g., ceramic, and a second metal layer 6 on the other side of the intermediate ceramic layer 4. A plurality of electrically conductive pins 8 extend through the layered assembly 2, 4 and 6 through coaxial holes extending through the respective layers, i.e., hole 10 extends through layer 2, hole 12 extends through layer 4, and hole 14 extends through layer 6. Glass seals within the holes in the metal layers are arranged to attach the pins to their respective layers, e.g., a glass seal 16 in hole 10 is arranged to attach a pin 8 to the first layer 2 and a glass seal 20 in hole 14 is arranged to attach the pin 8 to the third layer 6. The glass seals on the pins 8 are effective to provide fluid-tight seals between the pins 8 and the first and second layers 2, 6 and to retain the layered header assembly in a fixed spatial orientation with the ceramic layer 4 captured between the metallic layers 2, 6. A bend, e.g., bend 21 in pin 10, is provided in the portion of each of the pins 8 within the ceramic layer 4 to provide a stress relief for any temperature induced longitudinal stress in the pins 8 to avoid cracking of the glass seals.

A radial groove 22 in the intermediate ceramic layer 4 is provided in an outer surface of the layer 4 and extends between a peripheral edge 24 of the layer 4 and a central location 26. The central end 26 of the groove 24 is aligned with a hole 28 extending through the layer 2 and communicating with an outer surface 30 of the layer 2. A cylindrical support 34 is provided on the outer surface of the layer 4 to support a pressure sensor, e.g., a semiconductor chip 38. The cylindrical support 34 for the chip 38 is affixed to the outer surface 30 of the layer 2 to form a fluid-tight bond therebetween whereby a fluid-tight path is established between the peripheral edge 24 of the intermediate layer 4 and the sensor chip 38. Electrical connections 40 are provided between the chip 38 and the adjacent ends of the pins 8 which provide an electrical signal path between the sensor chip 38 and associated circuits (not shown) connected via electrical connections 41 to the opposite ends of the pins 8.

The layered assembly may ultimately be contained within a housing 42 having an internal fluid path 44 connecting with the peripheral edge port of the radial groove to supply a fluid pressure thereto while the other side of the sensor 38 is provided with a complementary pressure to produce a differential pressure output from the sensor 38. Such housing are well-known in the art, and a further discussion thereof is believed to be unnecessary in order to provide a complete understanding of the present invention. The header assembly 2, 4 and 6 may be attached to the outside housing by any suitable means, e.g., electron mean welding producing a fluid-tight weld bead 46 along the periphery of the first layer 2.

Accordingly, it may be seen, that there has been provided, in accordance with the present invention an improved pressure sensor header.

The embodiments of the present invention in which an exclusive property or privilege is claimed are defined as follows:

1. A pressure sensor header comprising
   a first metallic layer,
   a second metallic layer,
   an intermediate electrically non-conductive layer located between said first and second layers,
   a radial groove on an outer surface of said ceramic layer extending to a peripheral surface of said ceramic layer,
   a fluid port extending through said first layer communicating with an inner end of said radial groove and
   means for retaining said first, second and intermediate layers in a fixed spatial orientation.

2. A header as set forth in claim 1 wherein said means for retaining includes metallic pins extending through said first, second and intermediate layers and means for producing a fluid-tight bond between said pins and said first and second layers.

3. A header as set forth in claim 2 wherein each of said pins includes a stress relief bend in the portion of said pins within said ceramic layer.

4. A header as set forth in claim 2 wherein said means for producing a fluid-tight bond includes glass seals between said pins and said first and second layers.

5. A header as set forth in claim 1 wherein said first layer includes pressure sensor retaining means for providing a fluid path from said port to a fluid pressure sensor.

6. A header as set forth in claim 5 wherein said retaining means includes a hollow support tube coaxially arranged with said port and having a fluid-tight bond thereto.

7. A header as set forth in claim 1 wherein said intermediate layer is a ceramic material.

* * * * *